(12) United States Patent
Suzuki

(10) Patent No.: US 6,501,646 B2
(45) Date of Patent: *Dec. 31, 2002

(54) DOCKING APPARATUS FOR NOTE-TYPE PERSONAL COMPUTER HAVING IMPROVED RELEASING FUNCTION

(75) Inventor: Masato Suzuki, Yamagata (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/421,392

(22) Filed: Oct. 20, 1999

(65) Prior Publication Data

US 2002/0135965 A1 Sep. 26, 2002

(30) Foreign Application Priority Data

Oct. 21, 1998 (JP) .......................... 10-299795

(51) Int. Cl.[7] .............................. H05K 5/00; H05K 7/00
(52) U.S. Cl. ...................... 361/686; 361/683; 312/223.1
(58) Field of Search .......................... 361/170, 686.727, 361/683; 70/58, 59; 312/223.1, 223.2

(56) References Cited

U.S. PATENT DOCUMENTS

| | | | | |
|---|---|---|---|---|
| 5,394,552 A | * | 2/1995 | Shirota ........................ | 395/750 |
| 5,450,271 A | * | 9/1995 | Fukushima et al. .......... | 361/686 |
| 5,507,661 A | * | 4/1996 | Honda et al. ................ | 439/347 |
| 5,648,762 A | * | 7/1997 | Ichimura et al. ....... | 340/825.31 |
| 5,664,118 A | * | 9/1997 | Nishigaki et al. ........... | 395/283 |
| 5,737,541 A | * | 4/1998 | Shimizu et al. ............. | 395/281 |
| 5,738,537 A | * | 4/1998 | Setoguchi et al. .......... | 439/159 |
| 5,822,185 A | * | 10/1998 | Cavello ....................... | 361/686 |
| 5,870,283 A | * | 2/1999 | Maeda et al. ................ | 361/686 |
| 5,911,042 A | * | 6/1999 | Kugue ................... | 395/188.01 |
| 5,911,777 A | * | 6/1999 | Heredia ...................... | 713/200 |
| 5,930,517 A | | 7/1999 | Diehl et al. | |
| 6,151,218 A | * | 11/2000 | Pirdy et al. ................. | 361/727 |
| 6,185,095 B1 | * | 2/2001 | Helot et al. ................. | 361/686 |

FOREIGN PATENT DOCUMENTS

| | | | |
|---|---|---|---|
| JP | 1-201856 | 8/1989 | |
| JP | 4-63177 | 5/1992 | |
| JP | 6-176243 | 6/1994 | |
| JP | 6-348367 | 12/1994 | |
| JP | 8-305464 | 11/1996 | |
| JP | 9-62416 | 3/1997 | |
| JP | 9-97126 A | * 4/1997 | ............. G06F/1/16 |
| JP | 9-123787 | 5/1997 | |
| JP | 9-269848 A | * 10/1997 | ............. G06F/1/16 |
| JP | 10-198459 A | * 7/1998 | ............. G06F/1/16 |
| JP | 11-161368 | 6/1999 | |

\* cited by examiner

*Primary Examiner*—Anatoly Vortman
(74) *Attorney, Agent, or Firm*—Foley & Lardner

(57) ABSTRACT

In a docking apparatus for docking a note-type personal computer including a release lever, an ejecting structure for ejecting the note-type personal computer when the release lever is opened, and a solenoid-type eject stopper for stopping an operation of the ejecting structure, a detecting element is provided for detecting whether the release lever is closed or opened. A solenoid of the solenoid-type eject stopper is energized to stop the operation of the ejecting structure only when the docking apparatus receives an eject stopping signal from the note-type personal computer and the detecting element detects that the release lever is opened.

7 Claims, 4 Drawing Sheets

DOCKING APPARATUS FOR NOTE-TYPE PERSONAL COMPUTER HAVING IMPROVED RELEASING FUNCTION

BACKGROUND OF THE INVENTION

1. Field of the Invention

The present invention relates to a docking apparatus for a note-type personal computer.

2. Description of the Related Art

A note-type personal computer has often been docked to an extended station such as a port replicator.

In a prior art docking apparatus for docking a note-type personal computer, a release lever is provided, and an ejecting structure is provided for ejecting the note-type personal computer when the release lever is opened. Also, a solenoid-type eject stopper is provided for stopping an operation of the ejecting structure. Thus, a solenoid of the solenoid-type eject stopper is always energized to stop the operation of the ejecting structure when the docking apparatus receives an eject stopping signal from the note-type personal computer.

In the above-described prior art docking apparatus, however, since the eject stopper solenoid is always energized when an eject stopping signal is generated, the solenoid would be in an inoperative state by its magnetization. For example, the solenoid is overheated and overoperated. As a result, the eject stopper would erroneously operate. Also, the power consumption is remarkably increased.

SUMMARY OF THE INVENTION

It is an object of the present invention to provide a docking apparatus for a note-type personal computer having an improved release function capable of suppressing the erroneous operation and reducing unnecessary power consumption.

According to the present invention, in a docking apparatus for docking a note-type personal computer including a release lever, an ejecting structure for ejecting the note-type personal computer when the release lever is opened, and a solenoid-type eject stopper for stopping an operation of the ejecting structure, a detecting element is provided for detecting whether the release lever is closed or opened. A solenoid of the solenoid-type eject stopper is energized to stop the operation of the ejecting structure only when the docking apparatus receives an eject stopping signal from the note-type personal computer and the detecting element detects that the release lever is opened.

Thus, the operation duration of the eject stopper solenoid is decreased.

BRIEF DESCRIPTION OF THE DRAWINGS

The present invention will be more clearly understood from the description set forth below, with reference to the accompanying drawings, wherein.

DESCRIPTION OF THE PREFERRED EMBODIMENT

Figure 1:
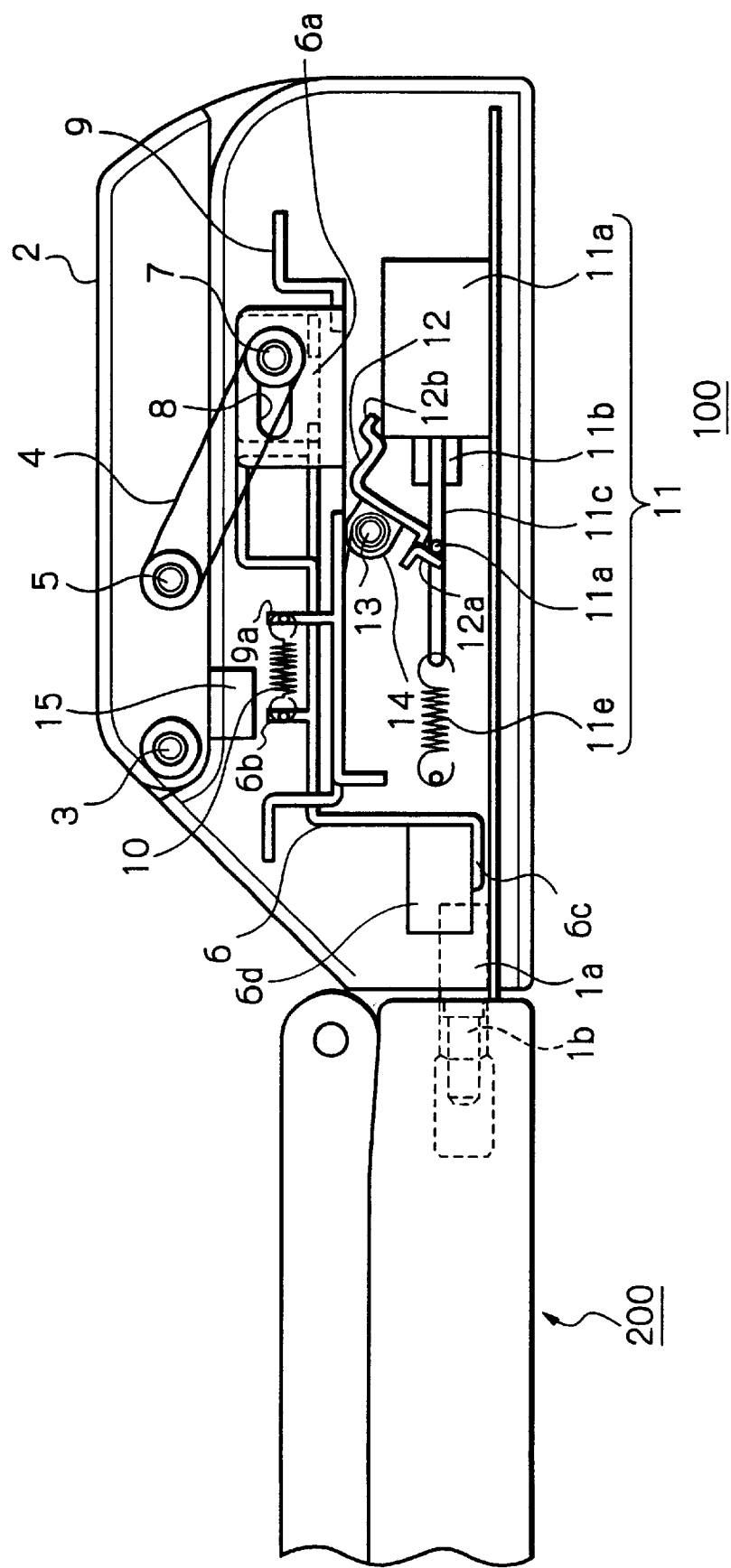
FIG. 1 is a schematic view illustrating an embodiment of the docking apparatus according to the present invention where the release lever is closed.
Figure 2:
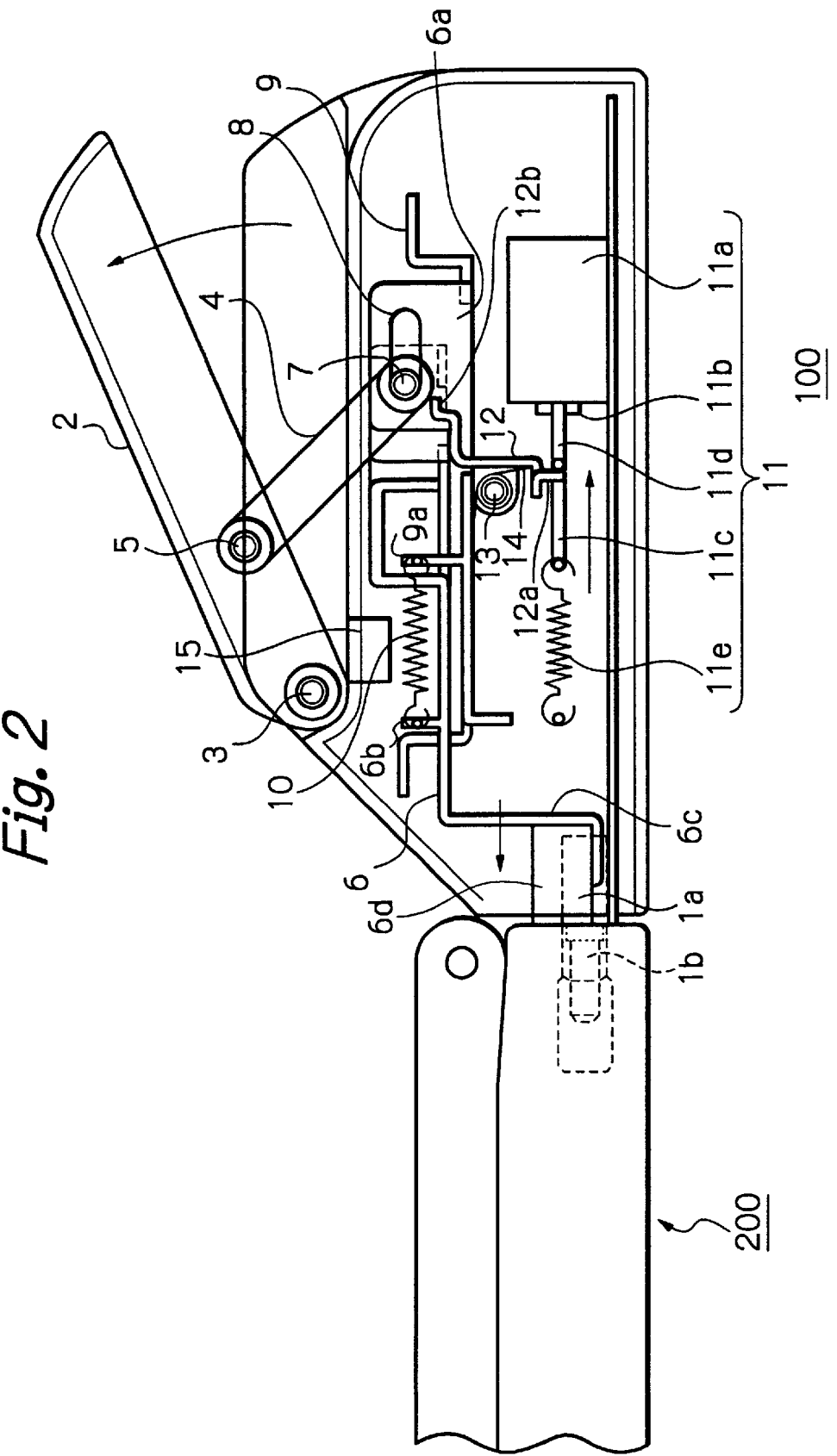
FIG. 2 is a schematic view of the docking apparatus of FIG. 1 where the release lever is opened.

In FIGS. 1 and 2, which are schematic views illustrating an embodiment of the docking apparatus according to the present invention, a docking apparatus 100 is coupled to a note-type personal computer 200 mechanically and electrically by a connector 1a on the side of the docking apparatus 100 and a connector 1b on the side of the note-type personal computer 200. Note that the docking apparatus 100 is, for example, a port replicator which is connected to a replication server incorporating a database management system (DBMS).

Also, the docking apparatus 100 has a release lever 2 for releasing the note-type personal computer 200 from the docking apparatus 100. The release lever 2 is closed and opened, respectively, in FIGS. 1 and 2; however, in FIG. 2, the docking apparatus 100 is still coupled to the note-type personal computer 200 due to the ON-state of the note-type personal computer 200.

The release lever 2 is rotatably coupled at an upper portion of a housing of the docking apparatus 100 by a pin 3. As a result, the release lever 2 can be pulled up as illustrated in FIG. 2.

Also, a hinge arm 4 is provided. An end of the hinge arm 4 is rotatably coupled to the release lever 2 by a pin 5 provided at a position of the release lever 2 which pin 5 is a little apart from the pin 3. The other end of the hinge arm 4 is rotatably coupled at a vertical plate portion 6a of a slide plate 6 provided within the docking apparatus 100 by a pin 7.

The pin 7 is inserted into a horizontal slot 8 perforated in the vertical plate 6a of the slide plate 6, so that the pin 7 slides within the horizontal slot 8 in accordance with the motion of the release lever 2.

A base plate 9 is fixed within the docking apparatus 100.

A tension state coil spring 10 is connected between a vertical bar 6b of the slide plate 6 and a vertical bar 9a of the base plate 9. As a result, the slide plate 6 is always pulled with respect to the base plate 9 toward the right direction in FIGS. 1 and 2 by the coil spring 10.

When the release lever 2 is closed as illustrated in FIG. 1, the slide plate 6, i.e., the pin 7 is moved toward the right direction with respect to the base plate 9, so that the release lever 2 is stably in a closed position. On the other hand, when the release lever 2 is opened, i.e., pulled up, as illustrated in FIG. 2, the hinge arm 4 pushes the slide plate 6 toward the left direction against the tension force of the coil spring 10. If the release lever 2 is again closed, the docking apparatus 100 returns from the state of FIG. 2 to the state of FIG. 1.

An eject stopper 11 is provided in the docking apparatus 100. The eject stopper 11 includes a solenoid 11a fixed at a bottom plate of the docking apparatus 100 of the docking apparatus 100, a slide core 11b, a bar 11c fixed at the slide code 11b, a pin 11d fixed at an intermediate position of the bar 11c, and a tension-type coil spring 11e connected between the end of the bar 11c and the housing of the docking apparatus 100. If the solenoid 11a is not energized, the slide core 11b is pulled out of the solenoid 11a by the coil spring 11e, as illustrated in FIG. 1. On the other hand, if the solenoid 11a is energized, the slide core 11b is pulled in the solenoid 11a against the tension force of the coil spring 11e, as illustrated in FIG. 2.

A crank-shaped hook bracket 12 is rotatably mounted on a pin 13 on which a coil spring 14 is wound. An end of the coil spring 14 is fixed to the base plate 9 and the other end of the coil spring 14 is fixed to the hook bracket 12. Therefore, the hook bracket 12 is rotated with respect to the pin 13 in the counterclockwise direction by the coil spring 13, so that an end 12a of the hook bracket 12 is also always in contact with the pin 11d. Therefore, if the solenoid 11a is not energized, the other end 12b of the hook bracket 12 is below the base plate 9, as illustrated in FIG. 1. On the other hand, the solenoid 11a is energized, the hook bracket 12 is rotated in the counterclockwise direction, so that the end 12b of the hook bracket 12 penetrates an opening of the base plate 9 and an opening of the slide plate 6, as illustrated in FIG. 2. Note that the solenoid 11a is energized only when the release lever 2 is opened, i.e., the slide plate 6 is moved toward the left direction. Thus, when the solenoid 11a is energized, the end 12b of the hook bracket 12 serves as a stopper for the slide plate 6.

A switch 15 is provided on an upper portion of the housing of the docking apparatus 100 for detecting whether the release lever 2 is closed or opened. That is, when the release lever 2 is closed as illustrated in FIG. 1, the switch 15 is turned OFF. On the other hand, when the release lever 2 is opened as illustrated in FIG. 2, the switch 15 is turned ON.

Figure 3:
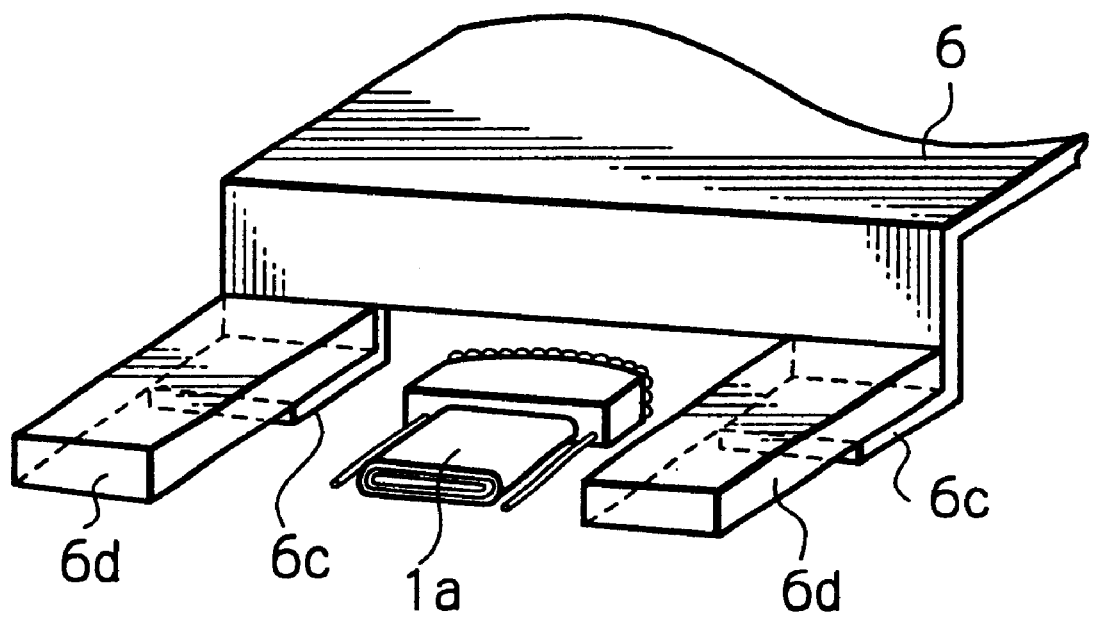
FIG. 3 is an enlargement of the slide plate of FIGS. 1 and 2.

As illustrated in FIG. 3, which is an enlargement of the slide plate 6 of FIGS. 1 and 2, the slide plate 6 has ejectors 6c associated with blocks 6d at their ends for releasing the note-type personal computer 200 from the docking apparatus 100 by ejecting (pushing) the note-type personal computer 200 from the docking apparatus 100. That is, when the release lever 2 is opened, the slide plate 6 is moved toward the left direction. However, the ejectors 6c associated with the blocks 6d have an allowance of motion. Therefore, before the ejectors 6c reaches a position as illustrated in FIG. 2, the note-type personal computer 200 is not pushed out. When the ejectors 6c are further moved toward the left direction as compared with the position as illustrated in FIG. 2, the note-type personal computer 200 is pushed out by the blocks 6d, so that the connector 1b is ejected from the connector 1a of the docking apparatus 100, i.e., the note-type personal computer 200 is released from the docking apparatus 100. Note that, if the solenoid 11a is energized, the ejectors 6c cannot be moved from the position as illustrated in FIG. 2, since the end 12b of the hook bracket 12 serves as a stopper for the slide plate 6.

Figure 4:
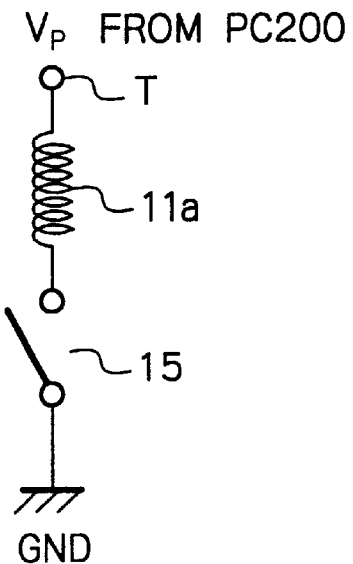
FIGS. 4 and 5 are circuit diagrams of the eject stopper solenoid and the switch of FIGS. 1 and 2.

In FIG. 4, which is a circuit diagram of the eject stopper solenoid 11a and the switch 15 of FIGS. 1 and 2, the solenoid 11a and the switch 15 are connected in series between a power supply terminal T and a ground terminal GND. The voltage $V_p$ at the power supply-terminal T is supplied as an eject stopping signal from the note-type personal computer 200 via the connector 1.

In FIG. 4, in a state where the eject stopping signal $V_p$ is in an OFF state ($V_p$=0V), even when the release lever 2 is opened to turn ON the switch 15, the solenoid 11a is not energized so that an eject stopping operation is not carried out. That is, the slide plate 6 is further moved toward the left direction as compared with the state as illustrated in FIG. 2, so that the note-type personal computer 200 is ejected (released) from the docking apparatus 100.

Also, in FIG. 4, in a state where the eject stopping signal $V_p$ is an ON state ($V_p$=5V~10V), when the release lever 2 is opened to turn ON the switch 15, the solenoid 11a is energized so that an eject stopping operation is carried out. That is, the slide plate 6 is moved toward the left direction just before the slide plate 6 reaches the position as illustrated in FIG. 2, so that the note-type personal computer is not ejected, i.e., not released from the docking apparatus 100.

Figure 5:
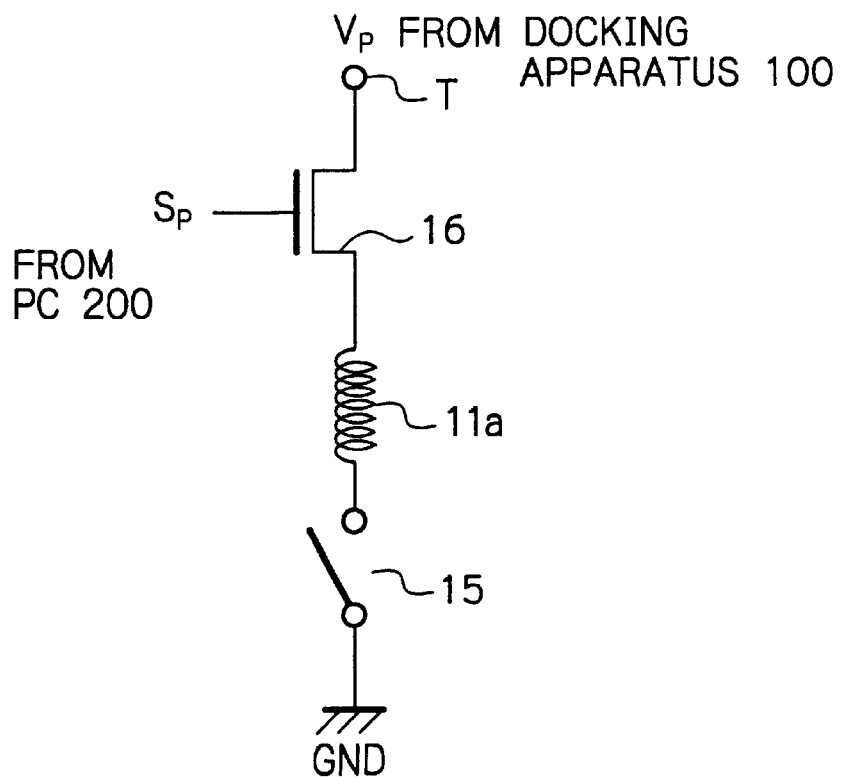

The circuit of FIG. 4 can be modified to a circuit as illustrated in FIG. 5. That is, the voltage $V_p$ is supplied from the docking apparatus 100 via a transistor 16 to the solenoid 11a and the switch 15. The transistor 16 is controlled by an eject stopping signal $S_p$ supplied from the note-type personal computer 200 via the connectors 1a and 1b.

Note that the operation of the circuit of FIG. 5 is the same as that of the circuit of FIG. 4.

The operation of the docking apparatus of FIGS. 1 and 2 will be explained next in detail.

Assume that a release operation is not required so that the eject stopping signal is generated. In this case, when the release lever 2 is opened, the slide plate 6 is moved toward the left direction. However, since the switch 15 is turned ON, the solenoid 11a is energized, so that the hook bracket 12 is rotated in the counterclockwise direction. As a result, the end 12b of the hook bracket 12 penetrates the openings of the base plate 9 and the slide plate 6, so that the left direction motion of the slide plate 6 is stopped at the position as illustrated in FIG. 2. Thus, the ejectors 6c associated with the blocks 6d cannot eject or push the note-type personal computer 200. Again, when the release lever 2 is closed, the slide plate 2 is moved toward the right direction. Simultaneously, the switch 15 is turned OFF to deenergize the solenoid 11a, and the bar 11c is moved toward the left direction by the coil spring 11e, so that the hook bracket 12 is rotated in the clockwise direction. Thus, the end 12b of the hook bracket 12 returns to its original position as illustrated in FIG. 1.

Also, assume that a release operation is required so that the eject stopping signal is not generated. In this case, when the release lever 2 is opened, the slide plate 6 is moved toward the left direction. Even when the switch 15 is turned ON, the solenoid 11a is not energized, so that the hook bracket 12 is not rotated in the counterclockwise direction. Therefore, the left direction motion of the slide plate 6 is not stopped. Thus, the ejectors 6c associated with the block 6d can eject or push the note-type personal computer 200. Again, when the release lever 2 is closed, the slide plate 6 is moved toward the right direction.

In the above-described embodiment, in a state where a release operation is not required, the eject stopper solenoid 11a is energized only when the release lever 2 is opened. For example, the eject stopper solenoid 11a is energized for only several seconds. Therefore, the overheating and overoperating of the eject stopper solenoid 11a can be avoid, and also, the power consumption can be remarkably decreased.

Also, in the above-described embodiment, the switch 15 for detecting whether the release lever 2 is closed or opened can be formed by a mechanical switch or a photo sensor.

As explained hereinabove, according to the present invention, the overheating and overoperating of the eject stopper solenoid can be avoided, and also, the power consumption can be decreased.

What is claimed is:

1. A docking apparatus for docking a note-type personal computer, comprising:
   a release lever,
   a detecting element for detecting whether said release lever is closed or opened;
   an ejecting structure, coupled to said release level, for ejecting said note-type personal computer when said release lever is opened;

a solenoid-type eject stopper including a solenoid engaging the ejecting structure to stop an operation of said ejecting structure, and a circuit, connecting said solenoid and said detecting element, for providing an eject stopping signal from said note-type personal computer to the solenoid, said solenoid of said solenoid-type eject stopper being energized to stop the operation of said ejecting structure only when said circuit receives said eject stopping signal and said detecting element detects that said release lever is opened.

2. The docking apparatus as set forth in claim 1, wherein said detecting element comprises a mechanical switch which is turned OFF and ON when said release lever is opened and closed, respectively.

3. The docking apparatus as set forth in claim 1, wherein said detecting element comprises a photo sensor.

4. A docking apparatus for docking a note-type personal computer, comprising:

a release lever;

a detecting element for detecting whether said release lever is closed or opened;

an ejecting structure, coupled to said release level, for ejecting said note-type personal computer when said release lever is opened; and a solenoid-type eject stopper for stopping an operation of said ejecting structure, wherein a solenoid of said solenoid-type eject stopper is energized to stop the operation of said ejecting structure only when said docking apparatus receives an eject stopping signal from said note-type personal computer and said detecting element detects that said release lever is opened, and wherein said detecting element and said solenoid are connected in series between a power supply terminal and a ground terminal, said power supply terminal receiving said eject stopping signal from said note-type personal computer.

5. A docking apparatus for docking a note-type personal computer, comprising:

a release lever;

a detecting element for detecting whether said release lever is closed or opened;

an ejecting structure, coupled to said release level, for ejecting said note-type personal computer when said release lever is opened;

a solenoid-type eject stopper for stopping an operation of said ejecting structure;

a transistor for receiving an eject stopping signal from said not-type personal computer, wherein a solenoid of said solenoid-type eject stopper is energized to stop the operation of said ejecting structure only when said docking apparatus receives said eject stopping signal and said detecting element detects that said release lever is opened, and wherein said transistor, said detecting element, and said solenoid are connected in series between a power supply terminal and a ground terminal, said power supply terminal receiving a power supply voltage from said docking apparatus.

6. A docking apparatus for docking a note-type personal computer, comprising:

a release lever;

a detecting element for detecting whether said release lever is closed or opened;

an ejecting structure, coupled to said release level, for ejecting said note-type personal computer when said release lever is opened; and a solenoid-type eject stopper for stopping an operation of said ejecting structure, wherein a solenoid of said solenoid-type eject stopper is energized to stop the operation of said ejecting structure only when said docking apparatus receives an eject stopping signal from said note-type personal computer and said detecting element detects that said release lever is opened, and wherein said ejecting structure comprises:
a base plate fixed to said docking apparatus; and
a slide plate slidably mounted on said base plate, said slide plate being moved by said release lever, said slide plate comprising at least one block for pushing said note-type personal computer.

7. The docking apparatus as set forth in claim 6, wherein said solenoid-type eject stopper further comprises:

a slide core slidably mounted in said solenoid;

a bar fixed to said slide core and having a first pin;

a second pin fixed to said docking apparatus; and a coil spring between said bar and said second pin, said docking apparatus further comprising:
a third pin fixed to said docking apparatus;
a crank-shaped hook bracket rotatably mounted on said third pin; and
a coil spring wound on said third pin and having a first end fixed to said base plate and a second end fixed to said crank-shaped hook, said crank-shaped hook bracket having a third end abutting against said first pin and a fourth end for stopping the operation of said slide plate.

* * * * *